US012180884B2

(12) United States Patent
Plamondon et al.

(10) Patent No.: US 12,180,884 B2
(45) Date of Patent: Dec. 31, 2024

(54) ROTARY ENGINE ROTOR AND METHOD

(71) Applicant: Pratt & Whitney Canada Corp., Longueuil (CA)

(72) Inventors: Etienne Plamondon, Candiac (CA); Michel Bousquet, Longueuil (CA); Ninad Joshi, Longueuil (CA); Vincent Savaria, Laval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/976,498

(22) Filed: Oct. 28, 2022

(65) Prior Publication Data

US 2024/0141826 A1 May 2, 2024

(51) Int. Cl.

| | |
|---|---|
| ***F01C 1/22*** | (2006.01) |
| ***F01C 21/08*** | (2006.01) |
| ***F02B 53/00*** | (2006.01) |
| ***F02B 55/02*** | (2006.01) |

(52) U.S. Cl.

CPC ................ *F02B 55/02* (2013.01); *F01C 1/22* (2013.01); *F01C 21/08* (2013.01); *F02B 2053/005* (2013.01); *F04C 2240/802* (2013.01); *F04C 2250/20* (2013.01)

(58) Field of Classification Search

CPC .......... F04C 2240/801; F04C 2240/802; F04C 2250/20; F01C 1/22; F01C 21/08; F02B 53/00; F02B 53/005; F02B 53/02; F02B 2053/005; F02B 55/02; F02B 55/14

See application file for complete search history.

(56) References Cited

U.S. PATENT DOCUMENTS

| | | | | |
|---|---|---|---|---|
| 3,196,847 | A * | 7/1965 | Penner | F01C 1/22 418/61.2 |
| 3,456,626 | A * | 7/1969 | Jones | F01C 19/10 418/115 |
| 3,847,517 | A * | 11/1974 | Hermes | F01C 1/22 418/61.2 |
| 3,995,602 | A * | 12/1976 | Burley | F02B 53/04 123/242 |
| 4,066,044 | A | 1/1978 | Jones | |
| 4,080,934 | A * | 3/1978 | Jones | F01C 1/22 |
| 10,995,618 | B2 | 5/2021 | Fan | |

FOREIGN PATENT DOCUMENTS

| | | | | |
|---|---|---|---|---|
| CN | 215213680 | U | 12/2021 | |
| EP | 2735701 | A1 * | 5/2014 | F01C 1/22 |
| GB | 964131 | A | 7/1964 | |

OTHER PUBLICATIONS

EP search report for EP23206687.8 dated Mar. 15, 2024.

* cited by examiner

*Primary Examiner* — Theresa Trieu
(74) *Attorney, Agent, or Firm* — Getz Balich LLC

(57) ABSTRACT

A rotary engine rotor and a method for supplying rotary engine rotors are provided. The rotary engine rotor has a center axis, a rotor body, a plurality of peripheral surfaces, and a plurality of recess members. The rotor body has a central bore that extends along the center axis. The plurality of peripheral surfaces are disposed around an exterior perimeter of the rotor body. Each of the plurality of recess members are disposed in a respective one of the plurality of peripheral surfaces. Each recess member includes an interior cavity open to an exterior of the rotor.

8 Claims, 4 Drawing Sheets

ROTARY ENGINE ROTOR AND METHOD

BACKGROUND OF THE INVENTION

1. Technical Field

The present disclosure relates rotary engines in general and to rotary engine rotors in particular.

2. Background Information

Combustion emissions and fuel consumption are critical parameters in the aerospace industry. Cleaner combustion emissions and more efficient fuel consumption drive new engine designs. Modern aircraft rotary engine designs often contemplate the use of conventional aviation fuels (e.g., AVGAS and other kerosene based fuels) as well as sustainable aviation fuels (SAFs). Although SAFs provide opportunities for improved combustion emissions and fuel consumption, they also present certain challenges. For example, conventional aviation fuels are fairly standardized throughout the world. SAFs, on the other hand, are typically based on organic compositions that may vary from country to country. The lack of standardization of SAFs can present combustion challenges that can offset the benefits they provide.

Rotary engines (sometimes referred to as Wankel engines) include a three-sided symmetrically shaped triangular rotor with three bow-shaped peripheral faces, an oval-like housing that surrounds the triangular rotor, and a central drive shaft (e.g., the "eccentric shaft" or "E-shaft") that passes through the center of the rotor. The rotor makes orbital revolutions around the central drive shaft. As the rotor orbitally rotates, each side of the rotor is brought closer to and then away from the wall of the housing, compressing and expanding the respective combustion chamber.

Rotary engine rotors typically include a depression (referred to as a "bathtub" or a "recess") disposed in each face of the triangular rotor. The geometry of the recess directly affects combustion within the respective combustion chambers during rotation of the rotor. The recess geometry in particular affects parameters such as chamber compression, fuel/air flow within the chamber (e.g., turbulence, vortices, etc.), flame propagation, combustion efficiency, emissions (e.g., combustion products, etc.), and overall engine performance. Rotor recess geometries may also be based at least in part on the type of fuel the engine is designed to burn.

What is needed is a rotary engine that can accommodate different fuel types while still providing desirable combustion performance, and a system that facilitates accomplishing the same.

SUMMARY

According to an aspect of the present disclosure, a rotary engine rotor having a center axis is provided that includes a rotor body, a plurality of peripheral surfaces, and a plurality of recess members. The rotor body has a central bore that extends along the center axis. The plurality of peripheral surfaces are disposed around an exterior perimeter of the rotor body. Each of the plurality of recess members are disposed in a respective one of the plurality of peripheral surfaces. Each recess member includes an interior cavity open to an exterior of the rotor.

In any of the aspects or embodiments described above and herein, each recess member may be permanently attached to a respective one of the peripheral surfaces.

In any of the aspects or embodiments described above and herein, each recess member may be removably attached to a respective one of the peripheral surfaces by an attachment mechanism.

In any of the aspects or embodiments described above and herein, the rotor body may include a plurality of seats, wherein each seat is disposed to receive and position a recess member relative to a respective one of the peripheral surfaces.

In any of the aspects or embodiments described above and herein, the plurality of peripheral surfaces may include a first peripheral surface, a second peripheral surface, and a third peripheral surface.

In any of the aspects or embodiments described above and herein, the rotor body may include a first axial end surface and a second axial end surface, spaced apart from one another, and the plurality of peripheral surfaces may extend between the first axial end surface and the second axial end surface, and the central bore may extend between the first axial end surface and the second axial end surface.

In any of the aspects or embodiments described above and herein, the rotor body may include a first seat disposed to receive and position a first recess member relative to a first peripheral surface, a second seat disposed to receive and position a second recess member relative to a second peripheral surface, and a third seat disposed to receive and position a third recess member relative to a third peripheral surface.

In any of the aspects or embodiments described above and herein, the first recess member may be permanently attached to the first peripheral surface, the second recess member may be permanently attached to the second peripheral surface, and the third recess member may be permanently attached to the third peripheral surface.

In any of the aspects or embodiments described above and herein, the first recess member may be removably attached to the first peripheral surface, the second recess member may be removably attached to the second peripheral surface, and the third recess member may be removably attached to the third peripheral surface.

According to another aspect of the present disclosure, a rotary engine rotor having a central axis may be provided that includes a rotor body, a first peripheral surface, a second peripheral surface, a third peripheral surface, a first recess member seat, a second recess member seat, and a third recess member seat. The rotor body has a central bore extending along the center axis. The first, second, and third peripheral surfaces are collectively disposed around an exterior perimeter of the rotor body. The first recess member seat is engaged with the first peripheral surface. The second recess member seat is engaged with the second peripheral surface. The third recess member seat is engaged with the third peripheral surface.

In any of the aspects or embodiments described above and herein, the first recess member seat may be configured to receive and position a first recess member, and the second recess member seat may be configured to receive and position a second recess member, and the third recess member seat may be configured to receive and position a third recess member. The first, second, and third recess members each include an open interior cavity, and the interior cavity of each of the first, second, and third recess members is substantially identical and may be configured for use with a first fuel.

In any of the aspects or embodiments described above and herein, the rotor may be configured so that the first recess member is exchangeable with a fourth recess member, and the second recess member is exchangeable with a fifth recess member, and the third recess member is exchangeable with a sixth recess member. The fourth, fifth, and sixth recess members each include an alternative open interior cavity, and the open alternative interior cavity of each of the fourth, fifth, and sixth recess members is substantially identical and is configured for use with a second fuel, and the second fuel is configured differently than the first fuel.

According to another aspect of the present disclosure, a method for supplying rotary engine rotors is provided. The method includes: a) determining an alternative fuel type to be combusted in a rotary engine; b) selecting one or rotors to be used in the rotary engine; wherein each of the one or more rotors includes a rotor body having a plurality of peripheral surfaces disposed around an exterior perimeter of the rotor body, a plurality of recesses, each said recess of the plurality of recesses disposed in a respective one of the plurality of peripheral surfaces, and wherein each said recess member includes an interior cavity open to an exterior of the rotor; and wherein the step of selecting the one or more rotors is based at least in part on the alternative fuel type to be combusted in the rotor engine.

In any of the aspects or embodiments described above and herein, the step of selecting one or rotors may include selecting the one or more rotors from a plurality of different rotor types, wherein the plurality of different rotor types includes a first rotor type configured for use with a first fuel type, and a second rotor type configured for use with a second fuel type.

In any of the aspects or embodiments described above and herein, the first fuel type may be produced in a first geographic region, and the second fuel type may be produced in a second geographic region, wherein the first geographic region is different than the second geographic region.

In any of the aspects or embodiments described above and herein, the first fuel type may be a first type of sustainable aviation fuel and the second fuel type may be a second type of sustainable aviation fuel.

In any of the aspects or embodiments described above and herein, at least one of the first fuel type or the second fuel type is a synthetic aviation fuel.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
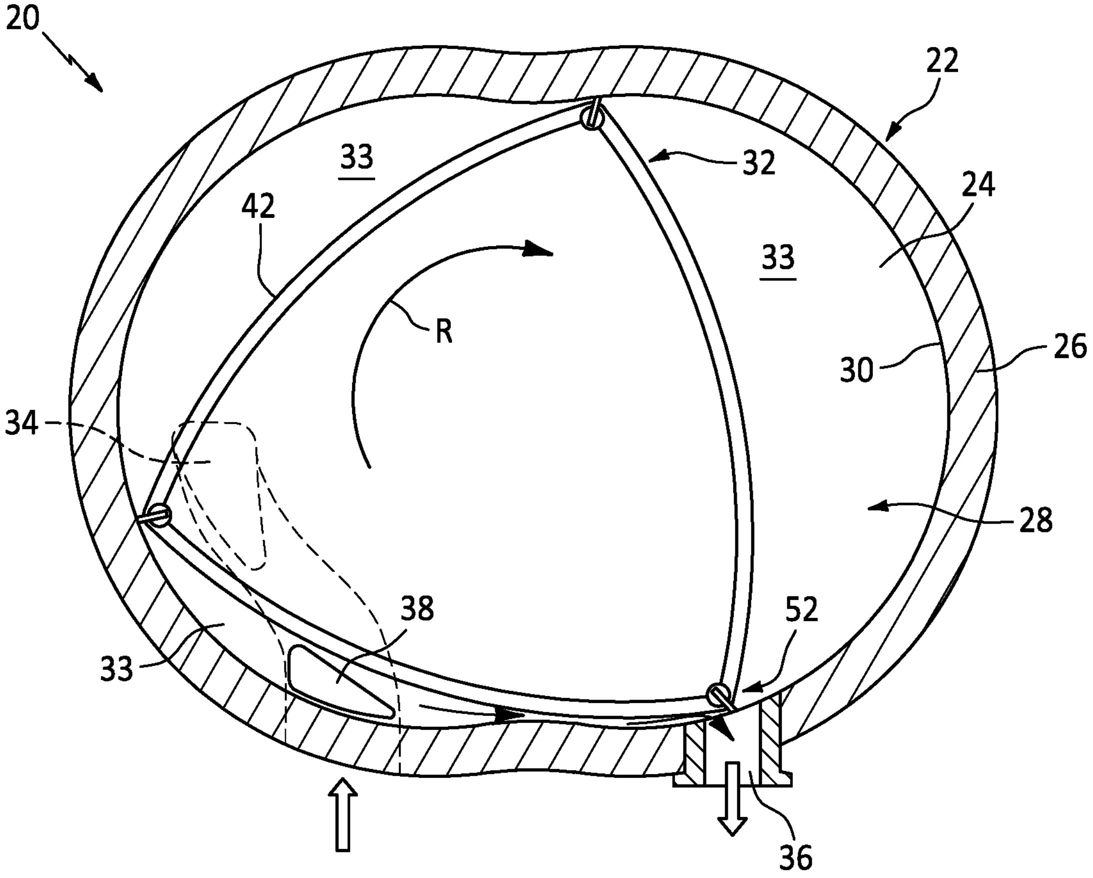
FIG. 1 is a diagrammatic illustration of a rotary engine.

Referring to FIG. 1, a rotary internal combustion engine ("rotary engine 20") sometimes referred to as a Wankel engine is diagrammatically shown. The rotary engine 20 includes an outer body 22 having axially-spaced end walls 24 with a peripheral wall 26 extending there between to form a combustion cavity 28. The inner surface 30 of the peripheral wall 26 of the combustion cavity 28 has a profile defining two lobes, which is preferably an epitrochoid. FIG. 1 diagrammatically illustrates a single rotor 32 disposed in a single combustion cavity 28. Embodiments of the present disclosure may be utilized with rotary engines 20 having more than one rotor 32 and more than one combustion cavity 28. Although not shown in the FIGURES, the rotor 32 is journaled on an eccentric portion of a shaft such that the shaft rotates the rotor 32 to perform orbital revolutions within the combustion cavity 28. The shaft rotates three times for each complete rotation of the rotor 32 as it moves around the combustion cavity 28. During each rotation of the rotor 32, each combustion chamber 33 (formed between a rotor peripheral surface 42 and the peripheral wall 26 of the outer body 22) varies in volume and moves around the combustion cavity 28 to undergo the four phases of intake, compression, expansion and exhaust, these phases being similar to the strokes in a reciprocating-type internal combustion engine having a four-stroke cycle.

The engine 20 includes a primary air inlet port 34, an exhaust port 36, and an optional purge port 38 in communication with a source of air (e.g. a compressor). The optional purge port 38 (not required by the present disclosure) is located between the inlet and exhaust ports 34, 36. The ports 34, 36, 38 may be defined in the outer body end wall 24 or in the outer body peripheral wall 26. In the embodiment diagrammatically shown in FIG. 1, the inlet port 34 and purge port 38 are defined in the outer body end wall 24 and communicate with an intake duct defined as a channel in the outer body end wall 24. The exhaust port 36 is defined through the outer body peripheral wall 26. The present disclosure is not limited to these configurations.

Figure 2:
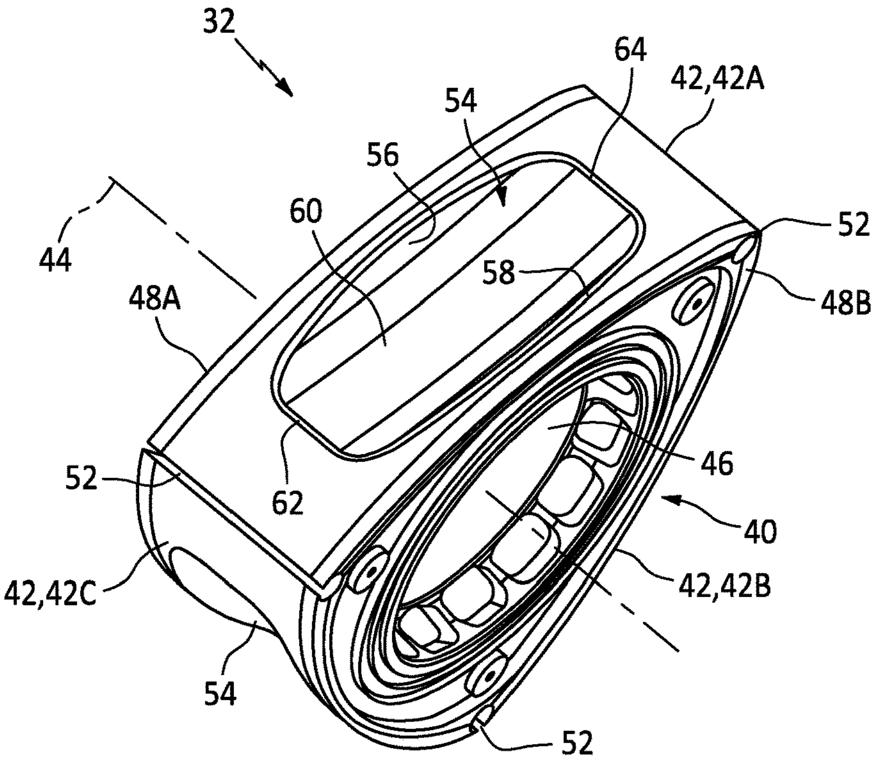
FIG. 2 is a diagrammatic perspective view of a rotary engine rotor embodiment.
Figure 3:
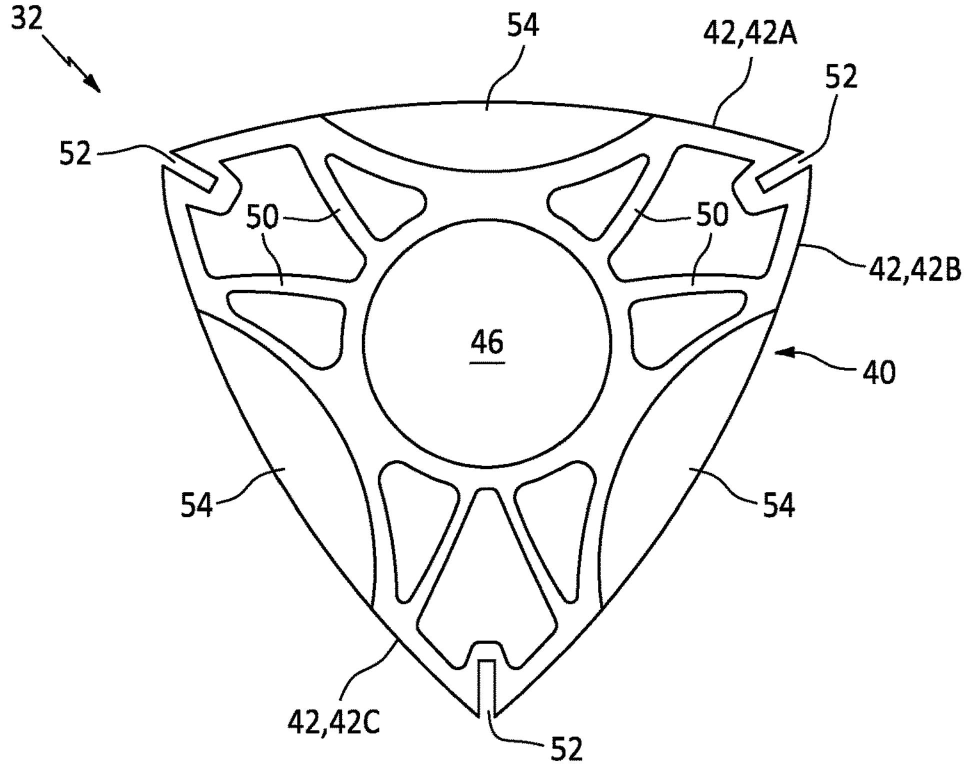
FIG. 3 is a diagrammatic planar view of a rotary engine rotor embodiment.

Referring to FIGS. 2 and 3, the rotor 32 has a rotor body 40, a plurality of peripheral surfaces 42 disposed around the exterior perimeter of the rotor body 40, and a center axis 44. The rotor body 40 includes a central bore 46 extending along the center axis 44 of the rotor body 40. The rotor body 40 may include a first axial end surface 48A and a second axial end surface 48B spaced apart from one another. In those embodiments wherein the rotor body 40 includes axial end surfaces 48A, 48B, the central bore 46 may extend between the axial end surfaces 48A, 48B and the peripheral surfaces 42 may extend between the axial end surfaces 48A, 48B. The central bore 46 may be configured to support a bearing that engages the rotor 32 with a shaft eccentric (not shown) of the rotary engine 20. In some embodiments, the rotor body 40 may include a plurality of ribs 50 (see FIG. 3) extending between the peripheral surfaces 42 and the central bore 46. The axial end surfaces 48A, 48B may be attached to the central bore 46, or to the ribs 50, or to the peripheral surfaces 42, or any combination thereof. The present disclosure is not limited to any particular rotor body 40 configuration unless specifically indicated herein.

The plurality of peripheral surfaces 42 may include first, second, and third peripheral surfaces 42A, 42B, 42C. Each peripheral surface 42A, 42B, 42C is outwardly arched, collectively defining a generally triangular profile. Adjacent peripheral surfaces 42A, 42B, 42C define a respective apex portion 52. An apex seal (not shown) is engaged with each respective apex portion 52 for sealing engagement with the inner surface 30 of combustion cavity peripheral wall 26. Other seals operate in combination with the apex seals to seal the three rotating combustion chambers 33 between the rotor 32 and the outer body 22 as is known in the prior art.

Figure 4A:
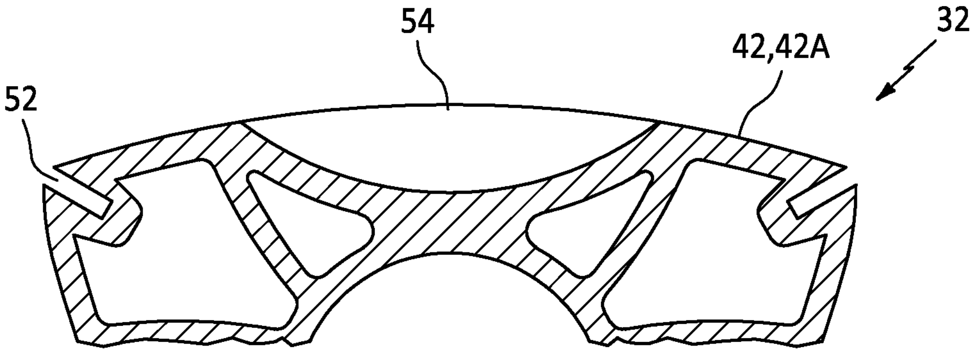
FIG. 4A is a diagrammatic partial planar view of a rotary engine rotor embodiment.
Figure 4B:
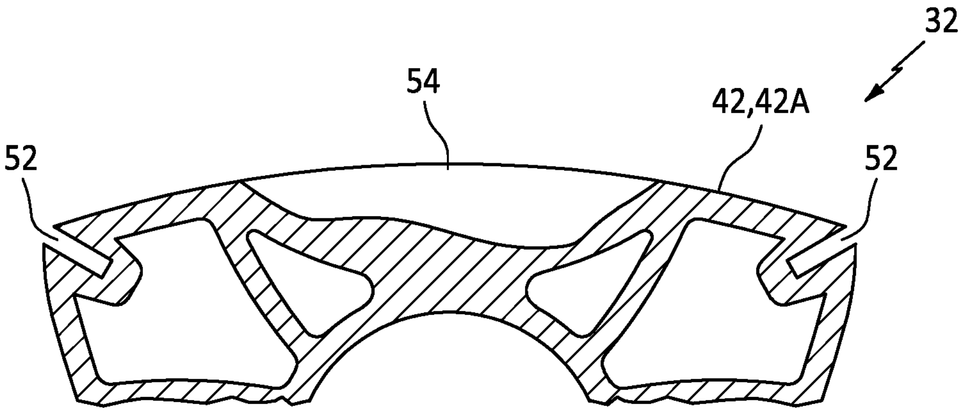
FIG. 4B is a diagrammatic partial planar view of a rotary engine rotor embodiment.
Figure 4C:
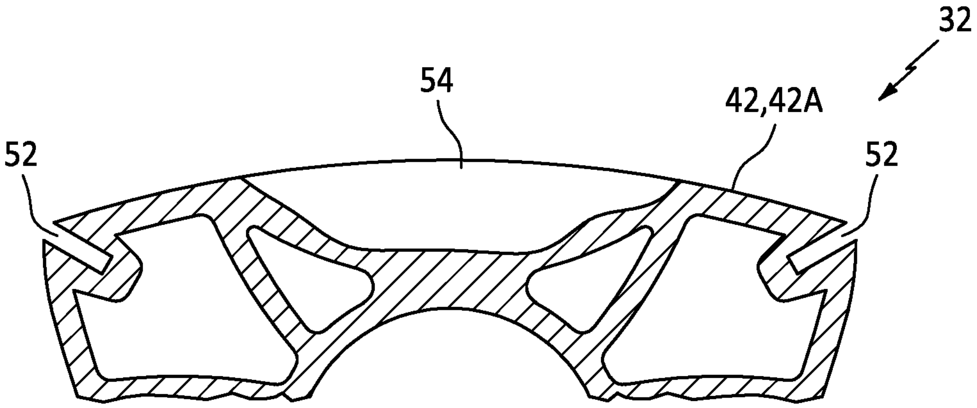
FIG. 4C is a diagrammatic partial planar view of a rotary engine rotor embodiment.

Each peripheral surface 42 includes a recess 54 disposed therein. Each recess 54 is a cavity defined by one or more wall surfaces and is open to the exterior of the rotor 32. In FIG. 2, for example, the recess 54 is defined by a first side wall surface 56, a second side wall surface 58, and a base wall surface 60. The base wall surface 60 extends between the first and second side wall surfaces 56, 58. A first edge 62 of the base wall surface 60 intersects with the peripheral surface 42 on one side of the recess 54, and a second edge 64 of the base wall surface 60 intersects with the peripheral surface 42 on an opposite side of the recess 54. The first and second side wall surfaces 56, 58 also intersect with the peripheral surface 42 and extend between the first and second edges 62, 64 of the base wall surface 60. The recess 54 shown in FIG. 2 is a nonlimiting example of a recess 54 geometry. The volume of the recess 54 cavity defines part of the volume of the corresponding combustion chamber 33. In a given rotor 32, all peripheral surface recesses 54 typically have the same geometric configuration. The specific geometric configuration of a recess 54 within a rotor 32 may be chosen to achieve various engine design parameters (e.g., chamber compression, fuel/air flow within the chamber, flame propagation, etc.) and to perform given certain operational parameters (e.g., fuel type). FIGS. 4A-4C diagrammatically illustrate three different recess 54 configurations, each associated with a different fuel type.

As indicated above, rotary engines may be configured to burn different fuel types, including, but not limited to, conventional kerosine-type aviation fuels like Jet-A, as well as sustainable aviation fuels (SAFs), hydrogen, liquid natural gas (LNG), and synthetic fuels. Conventional aviation fuels like Jet-A are substantially standardized throughout the world, and therefore the origin of the conventional aviation fuel is typically irrelevant provided the fuel is uncontaminated or otherwise compromised. A rotary engine configured to burn a conventional aviation fuel may, therefore, use a rotor 32 with recesses 54 configured for such conventional aviation fuel anywhere in the world.

Sustainable aviation fuels (SAF) may be defined as fuels that are made from feedstocks and/or waste products; e.g., municipal solid waste, cellulosic waste, used cooking oil, camelina, jatropha, halophytes, algae, etc. Very often an SAF will be produced from feedstocks and/or waste products that are locally available, which may vary regionally. As a result, a SAF available in a first region may be different from a SAF available in a second region. Both SAFs may be acceptable under applicable standards, but both may perform differently as a combustible fuel; e.g., differences in SAF properties (e.g., cetane number, density, viscosity, specific heat, etc.) may produce differences in the combustion process. Hence, a rotary engine rotor 32 with recesses 54 configured for optimal performance in an engine 20 burning a first SAF, may not produce optimal performance when the engine 20 burns a second SAF, and vice versa.

Aspects of the present disclosure include rotary engine rotor 32 configurations and a system for supplying rotary engine rotor 32 configurations associated with different fuel types.

Referring to FIG. 3, in some embodiments a present disclosure rotary engine rotor 32 may include recesses 54 that are integrally formed with the respective peripheral surface 42.

Figure 5:
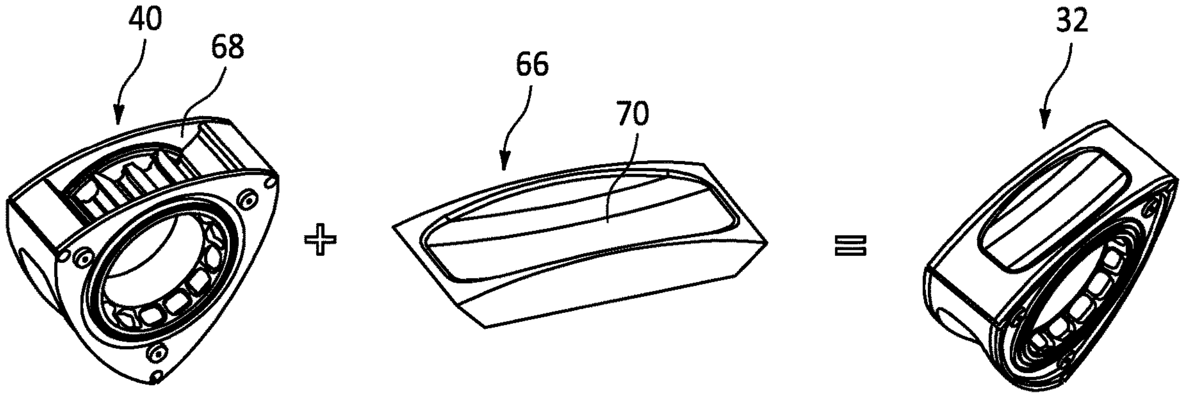
FIG. 5 is a diagrammatic illustration of a rotary engine rotor embodiment.
Figure 6:
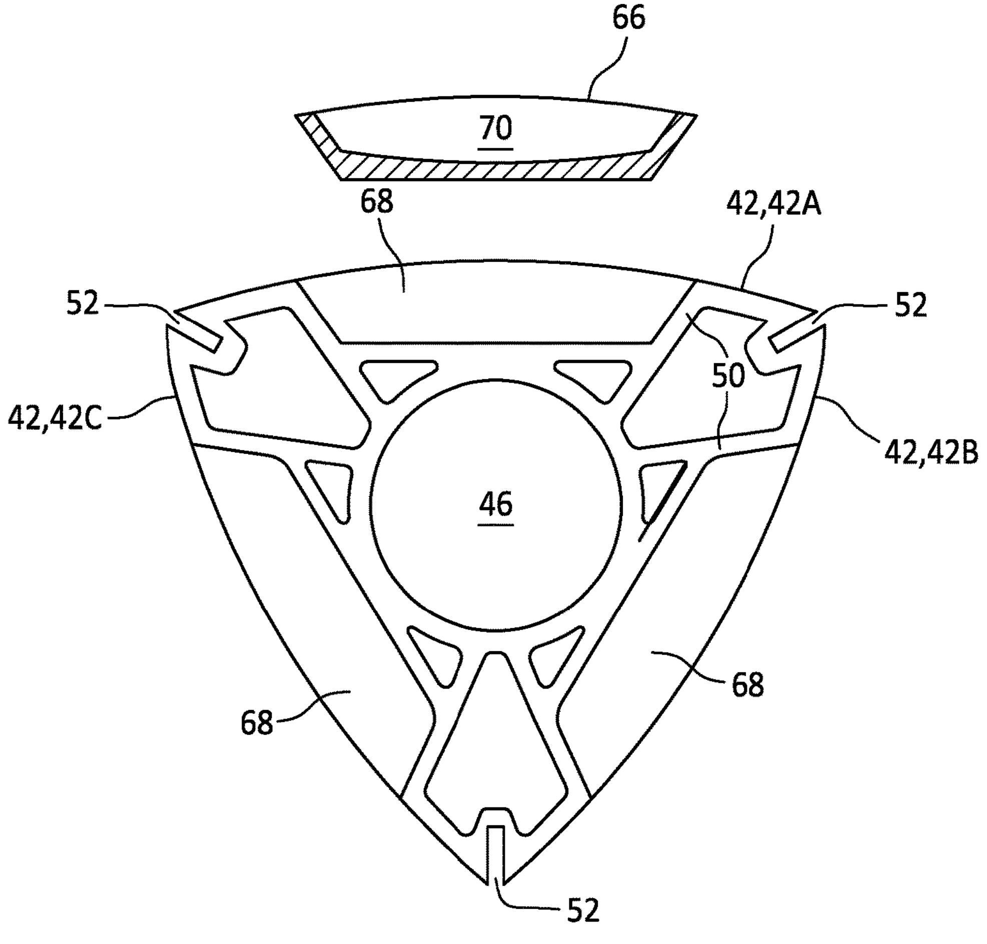
FIG. 6 is a diagrammatic illustration of a rotary engine rotor embodiment.

Referring to FIGS. 5 and 6, in some embodiments a present disclosure rotary engine rotor 32 may include a rotor body 40 and a plurality of selectively attachable recess members 66. The embodiments diagrammatically shown in FIGS. 5 and 6 include three selectively attachable recess members 66. In these embodiments, each rotor 32 includes a plurality of seats 68, each configured to receive a recess member 66. A seat 68 may be defined by an aperture in the respective peripheral surface 42, or alternatively the seat 68 may be defined by an aperture in the respective peripheral surface 42 and by structure (e.g., ribs 50) within the rotor body 40. The rotor 32 is configured to permit a recess member 66 to be secured within a seat 68. In some embodiments, the rotor 32 may be configured such that the recess members 66 are intended to be permanently attached to the rotor 32. In other embodiments, the rotor 32 may be configured such that the recess members 66 are selectively attachable (e.g., by mechanical fasteners, bonding agents, etc.) and can be removed. Regardless of whether the recess members 66 are permanently or selectively attachable, these embodiments provide a benefit of having a "universal" rotor 32 that can be customized by attaching specific recess members 66 configured for specific applications. Each recess member 66 includes one or more walls that define an interior cavity 70 of the recess member 66 (i.e., like the recess 54 cavity described above) and an exterior geometry of the recess member 66. The exterior geometry of the recess member 66 and the seat 68 may have mating geometries such that recess member 66 can be readily received within the respective seat 68.

The interior cavity 70 of a recess 54 (or recess member 66) may be configured for a particular rotary engine 20 application, including burning a particular fuel type. For example, a first rotor 32 may include recesses 54 (or recess members 66) having an interior cavity 70 geometry configured for optimal performance with a first fuel type, and a second rotor 32 may have recesses 54 (or recess members 66) having an interior cavity 70 geometry configured for optimal performance with a second fuel type (different from the first fuel type). In this manner, present disclosure rotors 32 may be produced for use with a variety of different fuels, each optimized for a different fuel.

Many airlines (or air carriers), private, public or governmental, operate flights in a limited geographic region. In such instances, aircraft may be powered by conventional aviation fuels or may be powered by fuels that are available only in that particular region; e.g., an SAF type that is produced, sold, and used in a particular region. The present disclosure permits a rotary engine 20 powered aircraft to be selectively configured for a specific fuel; e.g., a fuel that is available only in that particular region. The selective configuration may include rotors 32 having recesses 54 (or recess members 66) specifically configured for use with a regionally available fuel. In this manner, the present disclosure permits a rotary engine 20 to be configured for optimized performance, and at the same time use a regionally available alternative fuel such as an SAF that has environmental benefits.

The present disclosure system includes an original equipment manufacturer (OEM) ordering/supply system and method that considers whether an aircraft powered by a rotary engine 20 will be used for regional transportation, and if so what alternative fuels (e.g., SAFs) are used in that region. The present disclosure system/method includes an option to select a rotor 32 having recesses 54 (or recess members 66) with an interior cavity 70 that is best suited for a particular regionally available alternative fuel. These rotors 32 may be referred to as "fuel-customized" rotors. The present disclosure system/method permits the customer to select a fuel-customized rotor 32 as an OEM component. In some embodiments, the present disclosure system/method may include an ability to order replacement rotors 32 and/or replacement recess members 66. The system/method may permit the customer ordering replacement rotors 32 to specify a fuel-customized rotor 32 (or recess members 66) that are the same as those initially provided with the rotary engine 20. Alternatively, if a customer wishes to change the fuel that will be burned within the rotary engine 20 (e.g., because the original alternative fuel is no longer available, or an improved alternative fuel becomes available, etc.), the present disclosure system/method may allow the customer to order fuel-customized rotors 32 and/or recess members 66 that are configured for the new alternative fuel. In this manner, the rotary engine 20 can be retrofitted to maintain the benefits of a fuel-customized rotor 32 albeit with a new alternative fuel. Moreover, if a customer wishes to change from an alternative fuel to a conventional fuel or a synthetic fuel (or vice versa), the present disclosure system/method may allow the customer to request rotors 32 and/or recess members 66 that are configured for the new fuel. In addition, embodiments of the present disclosure system/method may also include an ability to order replacement rotors 32 (or replacement recess members 66) for purposes beyond specific fuels. For example, in some instances a customer may wish to change a rotor 32 (or rotor recess members 66) to change the performance of a rotary engine. For example, the current rotor 32 within an engine 20 may have recesses 54 (or recess members 66 with recesses 54) that are associated with a first compression value. If the customer desires to change the compression ratio of the engine 20, then the present disclosure system permits the customer to make such changes by replacing the existing rotor 32 with a replacement rotor 32 having recesses 54 associated with a second compression value different from the first compression value (or replacing the existing recess members 66 with replacement recess members 66). This aspect of the present disclosure can also be used to alter other performance aspects such as fuel/air flow within the chamber, flame propagation, and the like.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. For example, present disclosure rotors 32 are described herein as having axial end surfaces and peripheral surfaces 42. The term "surface" as used may include a single surface or may include a plurality of surface sections that collectively form a surface. Hence, the term "surface" is not intended to be limited to a single planar surface. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A rotor for a rotor, comprising:

a rotor body having:

a plurality of peripheral surfaces disposed around an exterior perimeter of the rotor body;

a plurality of seats, each respective seat disposed in a respective peripheral surface; and a plurality of recess members, each said recess member a structure independent of the rotor body, and each said recess member is attached to the rotor body;

wherein the rotor is configurable in a first configuration and a second configuration;

in the first configuration the plurality of recess members are first recess members, each said first recess member having a first interior cavity open to an exterior of the rotor body, the first interior cavity having a first geometric configuration; and in the second configuration the plurality of recess members are second recess members, each said second recess member having a second interior cavity open to the exterior of the rotor body, the second interior cavity having a second geometric configuration;

wherein the first geometric configuration is different from the second geometric configuration, and wherein the first geometric configuration is based on combustion of a first fuel type, and the second geometric configuration is based on combustion of a second fuel type, and the first fuel type and the second fuel type are different; and wherein each said seat is configured to interchangeably receive a respective first recess member or a respective second recess member, and in the first configuration of the rotor each respective seat receives a respective first recess member, and in the second configuration of the rotor each respective seat receives a respective second recess member.

2. The rotor of claim 1, wherein each said recess member is removably attached to the rotor body.

3. The rotor of claim 1, wherein the plurality of peripheral surfaces includes a first peripheral surface, a second peripheral surface, and a third peripheral surface.

4. The rotor of claim 3, wherein the rotor body includes a first axial end surface and a second axial end surface, spaced apart from one another, and the plurality of peripheral surfaces extend between the first axial end surface and the second axial end surface, and a central bore extends between the first axial end surface and the second axial end surface.

5. A rotor for a rotor, comprising:

a rotor body having:

a plurality of peripheral surfaces disposed around an exterior perimeter of the rotor body;

a plurality of seats, each respective seat disposed in a respective peripheral surface; and a plurality of recess members, each said recess member a structure independent of the rotor body, and each said recess member is attached to the rotor body;

wherein the rotor is configurable in a first configuration and a second configuration;

in the first configuration the plurality of recess members are first recess members, each said first recess member having a first interior cavity open to an exterior of the rotor body, the first interior cavity having a first geometric configuration; and in the second configuration the plurality of recess members are second recess members, each said second recess member having a second interior cavity open to the exterior of the rotor body, the second interior cavity having a second geometric configuration;

wherein the first geometric configuration is different from the second geometric configuration, and wherein the first geometric configuration defines a first volume, and the second geometric configuration defines a second volume, and the first volume and the second volume are different; and wherein each said seat is configured to interchangeably receive a respective first recess member or a respective second recess member, and in the first configuration of the rotor each respective seat receives a respective first recess member, and in the second configuration of the rotor each respective seat receives a respective second recess member.

6. The rotor of claim 5, wherein each said recess member is removably attached to the rotor body.

7. The rotor of claim 5, wherein the plurality of peripheral surfaces includes a first peripheral surface, a second peripheral surface, and a third peripheral surface.

8. The rotor of claim 7, wherein the rotor body includes a first axial end surface and a second axial end surface, spaced apart from one another, and the plurality of peripheral surfaces extend between the first axial end surface and the second axial end surface, and a central bore extends between the first axial end surface and the second axial end surface.

* * * * *